(12) United States Patent
Hendershot

(10) Patent No.: US 7,336,695 B1
(45) Date of Patent: Feb. 26, 2008

(54) M-ARY VARIABLE SHIFT KEYING COMMUNICATIONS SYSTEM

(76) Inventor: James R. Hendershot, 3810 Almar Rd., Grants Pass, OR (US) 97527

( * ) Notice: Subject to any disclaimer, the term of this patent is extended or adjusted under 35 U.S.C. 154(b) by 630 days.

(21) Appl. No.: 10/795,911

(22) Filed: Mar. 8, 2004

Related U.S. Application Data

(60) Provisional application No. 60/452,753, filed on Mar. 10, 2003.

(51) Int. Cl.
*H04B 1/00* (2006.01)

(52) U.S. Cl. ...................................... 375/132

(58) Field of Classification Search ............... 375/132, 375/133, 134, 135, 136, 329, 338, 346, 349
See application file for complete search history.

(56) References Cited

U.S. PATENT DOCUMENTS

| | | | | |
|---|---|---|---|---|
| 5,323,391 A | * | 6/1994 | Harrison | 370/210 |
| 5,325,394 A | * | 6/1994 | Bruckert | 375/148 |
| 6,049,562 A | * | 4/2000 | Dekker | 375/136 |
| 6,549,560 B1 | * | 4/2003 | Maiuzzo et al. | 375/136 |
| 6,693,980 B1 | * | 2/2004 | Linder et al. | 375/329 |
| 7,016,439 B2 | * | 3/2006 | Nuutinen et al. | 375/346 |

* cited by examiner

*Primary Examiner*—Sam K. Ahn
(74) *Attorney, Agent, or Firm*—Edward P Dutkiewicz

(57) ABSTRACT

An m-ary variable shift keying communications system with a signal transmitter which uses a frequency hopping architecture and conveys symbol information. A pseudorandom noise (PN) code is integrated into the transmitted signal. There is a code for the system in which there are "m" number of possible frequencies. A signal receiver has a plurality of channels. There is a detection means and a symbol decision means operatively coupled to the receiver. An error detection and correction means provides error correction of the received data.

7 Claims, 2 Drawing Sheets

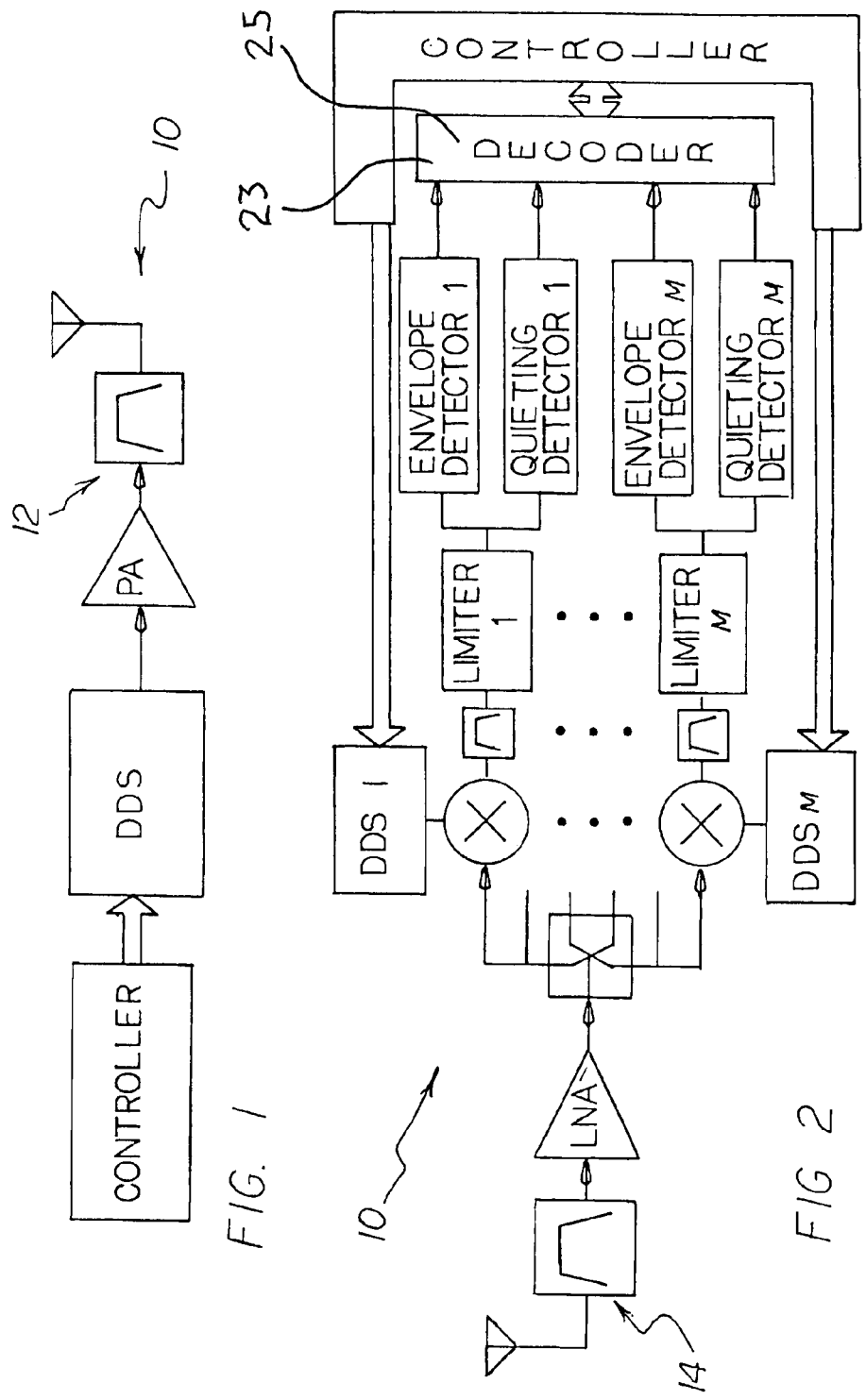

M-ARY VARIABLE SHIFT KEYING COMMUNICATIONS SYSTEM

RELATED APPLICATIONS

This application is a non-provisional application based on a provisional application, No. 60/452,753, filed on Mar. 10, 2003. This application claims the priority filing date of said provisional application.

BACKGROUND OF THE INVENTION

1. Field of the Invention

The present invention relates to an m-ary variable shift keying communications system and more particularly pertains to a new way of securely transmitting data using radio frequencies.

2. Description of the Prior Art

The use of other transmitting devices of known and expected configurations is known in the prior art. More specifically, other transmitting devices of known and expected configurations previously devised and utilized for the purpose of securely transmitting data are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, the aforementioned patents do not describe an m-ary variable shift keying communications system that allows a new way of securely transmitting data using radio frequencies.

In this respect, the m-ary variable shift keying communications system according to the present invention substantially departs from the conventional concepts and designs of the prior art, and in doing so provides an apparatus primarily developed for the purpose of a new way of securely transmitting data using radio frequencies.

Therefore, it can be appreciated that there exists a continuing need for a new and improved m-ary variable shift keying communications system which can be used for a new way of securely transmitting data using radio frequencies. In this regard, the present invention substantially fulfills this need.

SUMMARY OF THE INVENTION

In view of the foregoing disadvantages inherent in the known types of other transmitting devices of known and expected configurations now present in the prior art, the present invention provides an improved m-ary variable shift keying communications system. As such, the general purpose of the present invention, which will be described subsequently in greater detail, is to provide a new and improved m-ary variable shift keying communications system and method which has all the advantages of the prior art and none of the disadvantages.

To attain this, the present invention essentially comprises an m-ary variable shift keying communications system to allow a user to send and receive electronic signals without interference or fear of interception and interpretation. The term m-ary means a number set having "m" terms, such as binary having two member, and trinary having three, quaternary having four, and so forth. The system comprises several components, in combination. First provided is a signal transmitter. The transmitter is configured for sending a signal having a first pulse. The signal is implemented in analog hardware. The signal has a strength and a quieting effect. The transmitter is capable of sending a discrete frequency carrier pulse over any portion of a broad bandwidth that contains the signal. The transmitter uses a frequency hopping architecture. The signal conveys symbol information, with each symbol having at least one hop time per symbol. Next provided is a pseudorandom noise (PN) code. The PN code is integrated into the transmitted signal. The frequency of the carrier pulse is determined by a combination of the transmitted symbol information and the PN code value. The frequency of the carrier pulse is at a non-repetitive, variable offset from a previously transmitted pulse. The previously transmitted pulse is transmitted after the first pulse. The carrier pulse is at a variable offset from any other symbol pulse for a given hop time. Next provided is a code for the system. The code contains "m" number of possible frequencies for any given hop time and symbol. Each frequency represents the value of the symbol in conjunction with the PN code value for the specific hop time, with the number of bits per symbol being represented by logarithm of the base two of (m). Next provided is a signal receiver. The signal receiver has a plurality of channels implemented in analog hardware. The signal receiver is tuned during any given hop time to each of the "m" number of channels. Next provided is a detection means for each of the "m" channels of the receiver. The strength of the received carrier signal and the quieting effect of said carrier signal are detected and evaluated for maximum interference rejection. Next provided is a symbol decision means. The symbol decision means is operatively coupled to the receiver. The symbol decision means compares the strength and the quieting from each of the "m" channels. Lastly provided is an error detection and correction means. The error and detection means enables the receiver to select information from the detections means. The error detection and correction means provides error correction of the received data.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved m-ary variable shift keying communications system which has all of the advantages of the prior art other transmitting devices of known and expected configurations and none of the disadvantages.

It is another object of the present invention to provide a new and improved m-ary variable shift keying communications system which may be easily and efficiently manufactured and marketed.

It is further object of the present invention to provide a new and improved m-ary variable shift keying communications system which is of durable and reliable constructions.

An even further object of the present invention is to provide a new and improved m-ary variable shift keying communications system which is susceptible of a low cost of manufacture with regard to both materials and labor, and which accordingly is then susceptible of low prices of sale to the consuming public, thereby making such an m-ary variable shift keying communications system economically available to the buying public.

Even still another object of the present invention is to provide an m-ary variable shift keying communications system for a new way of securely transmitting data using radio frequencies.

Another object of the present invention is to provide an m-ary variable shift keying communications system is to provide a greater immunity to interference and jamming.

Another object of the present invention is to provide an m-ary variable shift keying communications system is to provide a lower probability of intercept.

Another object of the present invention is to provide an m-ary variable shift keying communications system is to provide a more efficient use of spectrum.

Another object of the present invention is to provide an m-ary variable shift keying communications system is to provide a ability to provide precision location.

Lastly, it is an object of the present invention to provide a new and improved m-ary variable shift keying communications system comprising, several components, in combination. A signal transmitter uses a frequency hopping architecture and conveys symbol information. A pseudorandom noise (PN) code is integrated into the transmitted signal. There is a code for the system in which there are "m" number of possible frequencies. A signal receiver has a plurality of channels. There is a detection means, and a symbol decision means operatively coupled to the receiver. An error detection and correction means provides error correction of the received data.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a block diagram depicting the system.

FIG. 2 is a MSVK Receiver block diagram.

The same reference numerals refer to the same parts throughout the various Figures.

DESCRIPTION OF THE PREFERRED EMBODIMENT

Figure 3:
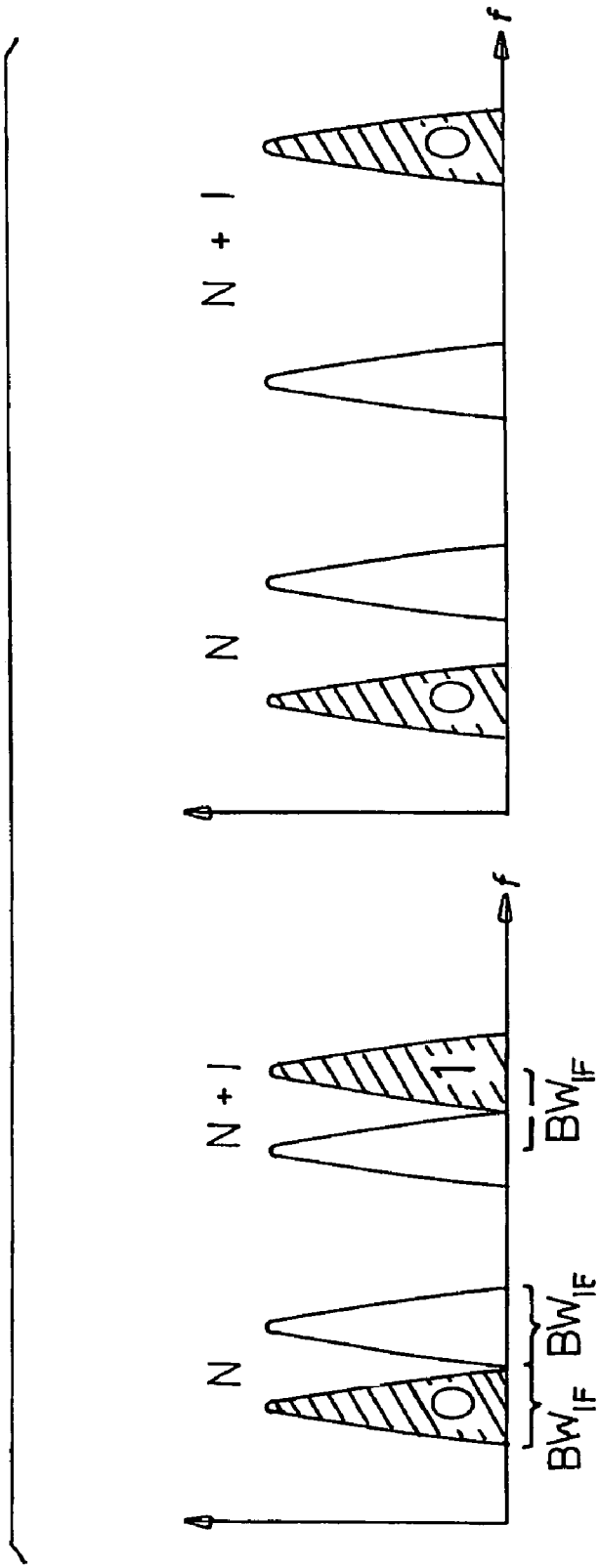
FIG. 3 is a comparison of a typical FHSS FSK to MVSK system.

With reference now to the drawings, and in particular to FIG. 1 thereof, the preferred embodiment of the new and improved m-ary variable shift keying communications system embodying the principles and concepts of the present invention and generally designated by the reference numeral 10 will be described.

The present invention, the m-ary variable shift keying communications system 10 is comprised of a plurality of components. Such components in their broadest context include a transmitter and signal, and a receiver. Such components are individually configured and correlated with respect to each other so as to obtain their desired objective. An m-ary variable shift keying communications system is disclosed. This system is configured to allow a user to send and receive electronic signals without interference or fear of interception and interpretation. The term m-ary means a number set having "m" terms, such as binary having two member, and trinary having three, quaternary having four, and so forth. The system comprises several components, in combination.

First provided is a signal transmitter 12. The transmitter is configured for sending a signal having a first pulse. The signal is implemented in analog hardware. The signal has a strength and a quieting effect. The transmitter is capable of sending a limited spectrum signal over any portion of a broad bandwidth. The signal transmitter also has a signal phase shifting capability.

The transmitter is capable of sending a discrete frequency carrier pulse over any portion of a broad bandwidth that contains the signal. The transmitter uses a frequency hopping architecture. The signal conveys symbol information, with each symbol having at least one hop time per symbol.

The signal may be a bare carrier signal having a modulation beta index of approximately zero.

In an alternative embodiment, the system may be configured to be implemented in digital hardware.

Next provided is a pseudorandom noise (PN) code. The PN code is integrated into the transmitted signal. The frequency of the carrier pulse is determined by a combination of the transmitted symbol information and the PN code value. The frequency of the carrier pulse is at a non-repetitive, variable offset from a previously transmitted pulse.

The previously transmitted pulse is transmitted after the first pulse. The carrier pulse is at a variable offset from any other symbol pulse for a given hop time. The bare carrier signal may be tuned to a channel predetermined by the PN code.

Next provided is a code for the system. The code contains "m" number of possible frequencies for any given hop time and symbol. Each frequency represents the value of the symbol in conjunction with the PN code value for the specific hop time, with the number of bits per symbol being represented by logarithm of the base two of (m).

Next provided is a signal receiver 14. The signal receiver has a plurality of channels implemented in analog hardware. The signal receiver is tuned during any given hop time to each of the "m" number of channels.

In an alternative embodiment the signal receiver may be implemented in digital hardware.

Next provided is a detection means for each of the "m" channels of the receiver. The strength of the received carrier signal and the quieting effect of said carrier signal are detected and evaluated for maximum interference rejection. The signal and quieting detection means may be utilized in each m channel where m is the next possible states of the transmitter and the m-ary variable key shifting order level.

Next provided is a symbol decision means. The symbol decision means is operatively coupled to the receiver. The symbol decision means compares the strength and the quieting from each of the "m" channels.

Lastly provided is an error detection and correction means. The error detection and correction means enables the receiver to select information from the detections means. The error detection and correction means provides error correction of the received data.

The m-ary variable shift keying ("MVSK") communications system is a highly reliable means of transmitting information by wireless means under adverse conditions, including heavy interference and multi-path, through the use of a novel frequency hopping, spread-spectrum mechanism. Information is sent by sending a carrier pulse on one of "m" frequencies, with the specific choice of frequency representing the exact value of the symbol sent. With each hop, the frequency representing the symbol changes in a defined manner, typically pseudo-randomly, thus mitigating the effects of interference and other frequency caused channel effects. A key aspect of the frequency versus symbol relationship is that it is completely variable from hop to hop, further mitigating the previously mentioned channel effects, thereby enhancing both communications reliability and security. This variability is a key difference between MVSK and previous frequency hopping systems. Additionally, the MSVK system uses a novel dual detection system, comprising both coherent and non-coherent detectors, which allows for even more robust operation under difficult conditions.

The MVSK system may be used to send a plurality of signals including, but not limited to, data, audio, video, telemetry and remote control signal, via radio. It provides a means of fast-frequency hopping spread-spectrum transmission which uses known, but variable frequency relationships to convey the information in a robust manner, under adverse conditions.

To date, there have been several systems developed to combat the effects of interference in radio communications systems. Among them are a variety of spread-spectrum systems which use techniques that include chirp, direct sequence and frequency hopping techniques.

Chirp systems use pulses that are swept in frequency. While MVSK systems can take advantage of chirp, they differ in that they use a variable hopped architecture, rather than a fixed chirp. If chirp is used in MVSK, each chirp has the potential to exist in different start and stop frequencies, unlike conventional chirped systems.

Direct sequence systems use a pseudorandom noise (PN) code to artificially increase the bandwidth of the signal. Again, PN coding of the MVSK pulses is a logical extension of the technology, but MVSK is inherently not a direct sequence system.

MVSK is, however, a specific case of spread-spectrum known as frequency hopping (FH). However, previously FH systems either send data as modulation on a carrier, which hops from frequency to frequency, or uses a discrete frequency spacing (or shift) to send the data (i.e. there is always a specific frequency shift between the carrier pulse that represents a one and the pulse that represents a zero). MVSK uses a variable shift, enhancing its resistance to frequency dependent channel effects and interference.

The carrier pulse frequency hopping architecture uses the presence of a carrier on a given frequency to convey symbol information. The frequency of the pulse determines the value of the symbol, and any number of possible "hop to" frequencies can be used (m) to allow for multiple bits per symbol. Higher orders of "m" allow for more bits per baud, reducing the required bandwidth of each pulse. It is this feature that allows the use of smaller, discrete spectrum segments for the transmission of high data rates than might otherwise occur.

In addition, the "bare carrier" frequency hopped approach mitigates the effects of incidental and intentional interference, and reduces the effects of multipath distortion. When applicable, a dual detection circuit enhances the reliability of detecting the correct pulse by comparing the received pulse levels with each other, as well as the quieting effect each pulse produces in a limited, FM demodulated environment. The demodulated signal stream from each of the detectors is routed to an error detection and correction system, which allows the MVSK receiver to most accurately determine the correct bit/symbol combination.

The MVSK combines the advantages of modern Spread Spectrum (SS) techniques with a higher order modulation format, optimally narrowband receiver design, intelligent baseband signal processing and adaptable spectrum management in order to produce a highly secure and reliable command, control and communication link.

As with many communications systems, the larger portion of the complexity of the design is contained in the receiver. Recent advances in the integration of major building blocks of the proposed transmitter and receiver allow for the realistic implementation of such a system from the standpoint of size, power consumption, cost, performance, and reliability. An MVSK system can operate as a one-way simple link, or even as a full duplex two-way link when transmit and receive band diversity is applied.

The "V" in MVSK comes from the fact that a special case of classic frequency hopping spread spectrum (FHSS) is used, wherein the transmitter changes the output carrier frequency once per symbol, and the separation between symbols in the frequency domain changes between hops. In a standard FHSS link using Frequency Shift Keying (FSK) as modulation method, the difference between symbol states in the frequency domain is a fixed value.

As with conventional FHSS, MVSK uses a synchronization procedure, along with knowledge of a Pseudorandom Noise (PN) code, to lock a given transmitter to a given receiver for establishing a link. A PN code is required in order to dictate the hopping sequence such that it appears essentially random to an unauthorized user, which forms the basis for the link resistance to interference, jamming and hostile interception. The intended variability of MVSK is such that the possible symbol states of a given transmission period could lie on opposite sides of the transmission space, even to the extent to being present in separate bands entirely. Foreknowledge of the PN code sequence is what allows the receiver to anticipate the next "m" possible states of the transmitter, where m is the MVSK order level.

Rather than merely simulate a communications link that is other wise identical to a non-hopped single channel implementation, MVSK takes data throughput and resistance to interference to a higher level. Instead of transmitting a carrier modulated data stream of one or more bits during each hop interval, MVSK employs intelligent receiver decoding and a bare carrier approach. For each hop interval, or across multiple intervals of a high hop rate implementation, the MVSK transmitter simply tunes a bare carrier to one of the m possible channels dictated by the PN code. Depending on the data, which can generally be assumed to be random, the identical point of a PN sequence may result in transmission on an entirely different frequency than the last time around, confounding jamming and interception alike. Even though each transmission represents m bits, only a very small receiver bandwidth is required, resulting in the applicability of inherently very high sensitivity receiver hardware to the proposed system.

The use of bare carrier modulation in an MVSK system alleviates many of the environmental problems affecting other modulation formats. All phase noise related issues, whether induced locally in the transmitter and receiver hardware or external in the communications channel, essentially disappear, since carrier phase is ignored by the system. While multi-path fading can still be an issue in extreme cases, the specifics of MVSK detection are such that the impact of this ubiquitous problem is greatly lessened.

Path induced amplitude and phase variations aside, the proposed MVSK hardware also shows an enhanced resistance to the inevitable thermal Additive White Gaussian Noise (AWGN) of the channel. The enhanced channel and noise rejection performance of MVSK is based in great part on the dual mode detection method implemented in the hardware.

Two methods of detecting which of the m receivers has been excited by the transmitter in a given hop period are utilized in an MVSK receiver. Envelope detection, which is essentially a time averaged version of amplitude modulation (AM) detection, and quieting detection implemented as a hard limited, frequency modulation (FM) quadrature detection operation are used in each of the m channels of the MVSK receiver. Both detection methods play into the symbol decision simultaneously, and each has separate advantages and vulnerabilities.

The envelope detection method used in MVSK reception simply observes and compares the time average level of energy filling the bandwidth of each of the m channels in the receiver. Whichever channel exhibits the highest output level is deemed to the correct symbol decision for the hop duration. The advantage of the envelope detection method is that no modulation need be decoded other than the presence, or absence, of a carrier. This means that the co-channel energy from a jammer, intentional or otherwise, will simply tend to reinforce the correct symbol decision. Wideband interference will also not degrade the symbol decisions made using this detection method at all until the interference becomes so severe as to destroy the link entirely, which is not likely under realistic operating conditions.

The quieting detection method relies upon the special characteristics of an FM receiver employing frequency domain amplitude limiting. Not to be confused with "FM improvement", quieting results from the nonlinear limiting operation result whereby the stronger of any two signals tends to dominate, or "capture", the operation of the FM detector. Since MVSK employs bare carrier transmission, which is essentially a modulation index (beta) of zero, so long as the desired signal is present at levels exceeding the AWGN and interference floor, then quieting will occur. If, on the other hand, the AWGN floor or an interference signal exceeds the desired signal at the detector, then the detected output will reflect the information or random noise of the larger signal. The MVSK carrier detection method, therefore, actually makes a symbol decision based on which of the m receiver channels contains the least amount of noise or intentional modulation during a give transmission period. Benefits of the MVSK carrier detection method include the ability to ignore any modulated interferer on any of the m channels except the one currently occupied by the signal of interest.

Once the symbol decisions of the two MVSK detection methods have been made, then the proposed system turns to intelligent signal processing to gain even further advantage over more common communication systems. The differences in vulnerabilities of the two detection methods mean that even conflicting results can enhance the ultimate data payload sequence detection. The term "erasure" refers to the general result of conflicting symbol decisions between, or even internal to, the envelope and carrier detection methods. A high powered, noise modulated jammer, for example, could lead to a conflict between all of the envelope detection output, but may still allow for quieting to take place only on the correct carrier detection channel. In this case, the envelope detector result would be an erasure, and the carrier detector decision would be retained. In the case of two seemingly valid, but conflicting, symbol decisions from the envelope and carrier detection comparators, an erasure would propagate through the decision criteria and be provided to the decoder logic as the only reasonable result. The responsibility for replacing the erasure in the information stream with the valid symbol would then fall to the forward error correction (FEC) capabilities of the decoder logic. Depending on the type of FEC used, an erasure can simply indicate an error in the bit stream to be disregarded or can even allow for more than the normal amount of bit errors to actually be corrected with a given code block.

Advanced versions of an MVSK system may even employ dynamic masking of those hop channels that consistently produce erasures or errors, adapting in real time to the channel environment at hand. The effort used to develop a more defined dynamic hop sequence adaptation capability can be shared in large part with designing in the ability to add and drop expected users from the network on the fly in burst mode.

In order to optimize individual pulse shaping, as well as increase hop rate, a user may use two DDS synthesizers. This application would increase the hop rate by allowing one DDS to be programmed while the other is generating the current signal. Also, the user of two DDS's allows their outputs to be shaped individually, such that one DDS pulse can be rising as the other is falling, allowing better spectral density of the MVSK signal.

In the MVSK receiver, all incoming pulses are converted to a fixed IF frequency for information recovery. This is a common technique use in virtually all superheterodyne receivers. If all of the signal sources for the transmitter and the receiver are locked to common references (one at the transmitter and one at the receiver), an option presents itself for increasing the number of bits that can be sent in one symbol, without increasing the transmitted bandwidth. That option is adjusting (and detecting) the phase of the transmitted carrier pulse.

In a Multi-phase MVSK (or MPM) system, the phase of each transmitted pulse can be controlled with relation to the previously transmitted pulses. For example, the phase of a given pulse may be the same as the previous one, 180 degrees out of phase, 90 degrees out of phase, or 270 degrees out of phase. This phase difference can be detected at the receiver, resulting in additional bit information for each pulse. In the case of the four phase example just given, an additional two bits can be sent, which in a QVSK system, would double the data rate.

This increase in data rate does not come at an increase in occupied bandwidth. Since there is no change in phase during the transmitted pulse, no additional sidebands are generated, and so no increase in transmitted bandwidth is created. MPM comes at a cost in receiver sensitivity, as detecting the phase of each pulse requires more sensitivity than merely detecting the presence of the pulse, but for systems needing additional capacity, this is an acceptable tradeoff.

If enough bandwidth is available, then the individual carrier pulses could be replaced by frequency chirps. This would add additional process gain, and allow for channel sharing, differentiation by chirp and additional interference rejection.

As in any other radio system, it is possible to modulate the carrier involved. For example each pulse could be modulated in either amplitude or frequency to convey additional information. For instance, if a voice signal was digitized to be sent over an MVSK link, a rough approximation of the voice could be sent with the data, and the fine, remaining bits sent as analog information by modulating the frequency, phase, or amplitude of the carrier pulses. The same process could be applied to any other analog signal, including video.

Lastly, instead of sending a pulse on only one frequency, an MVSK transmitter could send simultaneous pulses on several frequencies, increasing the data rate for a given symbol rate. This would, or course, increase the amount of transmitter power required for a given link margin, but would increase capacity accordingly. This is typically an acceptable tradeoff.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An m-ary variable shift keying communications system to allow a user to send and receive electronic signals without interference or fear of interception and interpretation, comprising, in combination:

signal transmitter, the transmitter configured for sending a signal having a first pulse, the signal having a strength and a quieting effect, the transmitter capable of sending a discrete frequency carrier pulse over any portion of a broad bandwidth that contains the signal, the transmitter using a frequency hopping architecture, the signal conveying symbol information, with each symbol having at least one hop time per symbol;

a pseudorandom noise (PN) code integrated into the transmitted signal, the frequency of the carrier pulse being determined by a combination of the transmitted symbol information and a PN code value, the frequency of the carrier pulse being at a non-repetitive, variable offset from a previously transmitted pulse, the previously transmitted pulse being transmitted after the first pulse, the carrier pulse being at a variable offset from any other symbol pulse for a given hop time;

a code for the system in which there are "m" number of possible frequencies for any given hop time and symbol, with "m" representing an integer, each frequency representing the value of the symbol in conjunction with the PN code value for the specific hop time, the number of bits per symbol being represented by logarithm of the base two of (m);

a signal receiver configured to receive data having a plurality of channels implemented in analog hardware, with the signal receiver being tuned during any given hop time to each of the "m" number of channels;

a detection means for each of the "m" channels of the receiver wherein both the strength of the received carrier signal and the quieting effect of said carrier signal are detected and evaluated for maximum interference rejection;

a symbol decision means operatively coupled to the receiver, the symbol decision means comparing the strength and the quieting effect from each of the "m" channels; and, an error detection and correction means enabling the receiver to select information from the detections means, the error detection and correction means providing error correction of the received data.

2. An m-ary variable shift keying communications system, as described in claim 1, wherein the system further comprises timed chirps in place of individual carrier pulses, along with a means for determining distance between a plurality of signal transmitters and signal receivers.

3. An m-ary variable shift keying communications system, as described in claim 1, wherein the signal transmitter is configured to shift the relative phase of each carrier pulse, with the signal receiver having a detection means to decode data encoded by those phase shifts.

4. An m-ary variable shift keying communications system, as described in claim 1, wherein the signal transmitter is configured to modify the parameters of the signal, the parameters being at least one of the class of parameters including amplitude and phase and frequency.

5. An m-ary variable shift keying communications system comprising, in combination:

a signal transmitter, the transmitter configured for sending a signal over any portion of a broad bandwidth using a frequency hopping architecture, the signal conveying symbol information, with each symbol having at least one hop time per symbol;

a pseudorandom noise (PN) code integrated into the transmitted signal, the frequency of the carrier pulse being determined by a combination of the transmitted symbol information and a PN code value;

a code for the system in which there are "m" number of possible frequencies for any given hop time and symbol, where "m" is an integer;

a signal receiver configured to receive data having a plurality of channels, with the signal receiver to each of the "m" number of channels;

a detection means for each of the "m" channels of the receiver wherein both the strength of the received carrier signal and the quieting effect of said carrier signal are detected and evaluated;

a symbol decision means operatively coupled to the receiver, the symbol decision means comparing the strength and the quieting from each of the "m" channels; and, an error detection and correction means providing error correction of the received data.

6. An m-ary variable shift keying communications system as described in claim 5 wherein the system further comprises the frequency of the carrier pulse being at a non-repetitive, variable offset from a previous pulse, the carrier pulse being at a variable offset from any other symbol pulse for a given hop time.

7. An m-ary variable shift keying communications system as described in claim 5 wherein the system further comprises each frequency representing the value of the symbol in conjunction with the PN code value for the specific hop time, the number of bits per symbol being represented by logarithm of the base two of "m".

* * * * *